E. J. L. GAUTHIER.
SPRING SUSPENSION FOR VEHICLES.
APPLICATION FILED JULY 2, 1920.

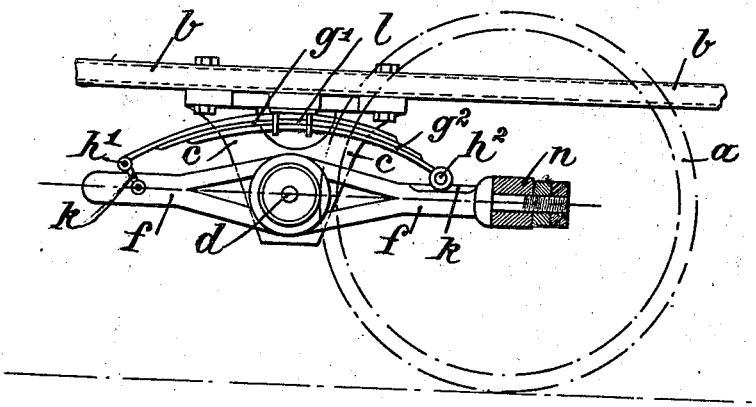
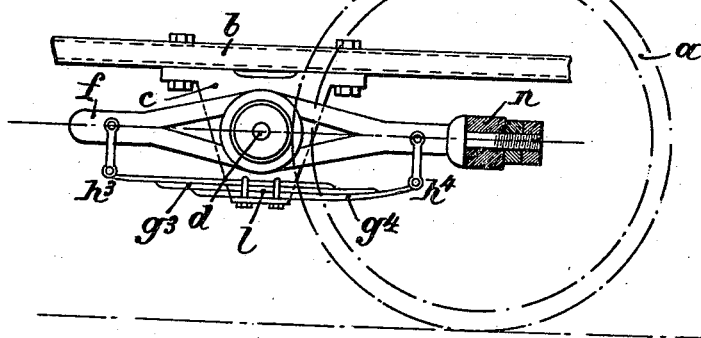
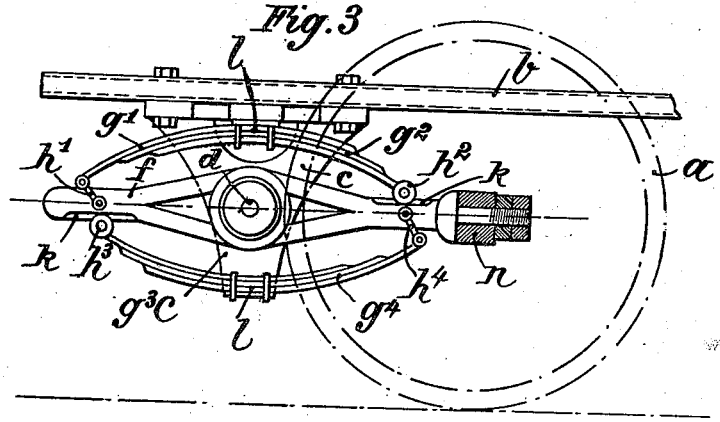

1,425,849.

Patented Aug. 15, 1922.
3 SHEETS—SHEET 2.

Inventor.
Edmond J. L. Gauthier,
By Henry Orth Jr.
Atty.

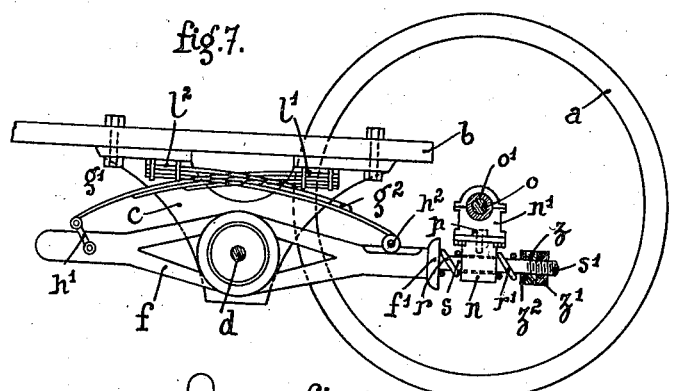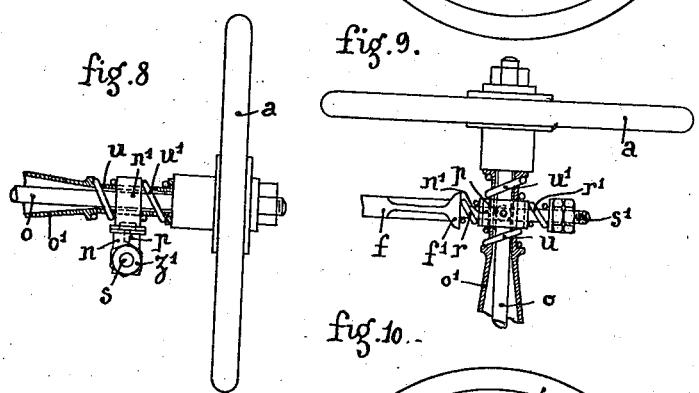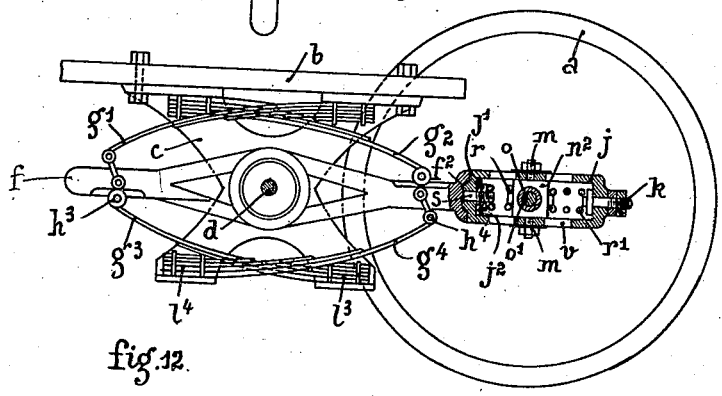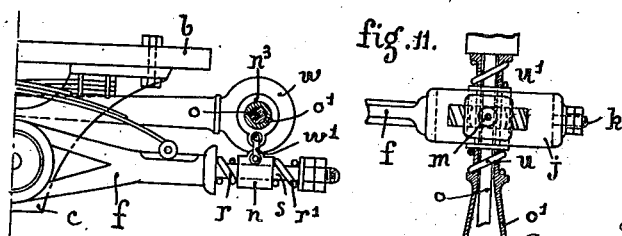

UNITED STATES PATENT OFFICE.

EDMOND JEAN LEON GAUTHIER, OF PARIS, FRANCE.

SPRING SUSPENSION FOR VEHICLES.

1,425,849.　　　　Specification of Letters Patent.　　Patented Aug. 15, 1922.

Application filed July 2, 1920. Serial No. 393,764.

(GRANTED UNDER THE PROVISIONS OF THE ACT OF MARCH 3, 1921, 41 STAT. L., 1313.)

*To all whom it may concern:*

Be it known that I, EDMOND JEAN LEON GAUTHIER, a citizen of France, residing at Paris, France, have invented certain new and useful Improvements in Spring Suspensions for Vehicles, for which I have filed applications for patents in France, July 10, 1914; November 12, 1917; November 29, 1917; and April 7, 1920, of which the following is a specification.

This invention relates to resilient suspension means for motor propelled vehicles, in which the shocks received by the wheels are suitably equilibrated and thus reduced to zero. This result is obtained by transforming the vertical shocks into two equal and directly opposite thrusts by means of a lever acting at the same time upon oppositely disposed plate springs, the longitudinal and transverse shocks being chiefly absorbed by springs mounted upon the axle of the vehicle.

The following description together with the accompanying drawings, which are given by way of example, sets forth the means employed for carrying this invention into effect. In these drawings, the mechanical dispositions have been simplified for the sake of clearness, but in practice the several members are provided with lubricating devices, with or without pressure, as well as with dust protecting members, means for adjustment, and the like.

Figs. 1 and 2 show side elevations of different arrangements with a single spring of the double acting type.

Fig. 3 is a side elevation of an arrangement employing two springs of the double acting type.

Fig. 7 is a side elevation of a disposition employing two half-springs of the single acting type, and in which the end of the lever arm has mounted thereon the wheel axle with longitudinal shock absorbing members.

Figs. 8 and 9 show respectively in rear elevation and in plan with certain portions in section, the same method of mounting the axle with longitudinal and transverse shock absorbing members.

Fig. 10 is a side elevation of an arrangement comprising four half-springs of the single acting type and showing at the end of the lever another disposition of the wheel axle with longitudinal shock absorbing members.

Fig. 11 is a plan view with certain parts in section, of the same disposition of the axle with longitudinal and transverse shock absorbing members.

Fig. 12 is a side elevation of a disposition of the rear axle showing the method of mounting the same by means of shackles.

In these figures, $a$ designates the vehicle wheel, $b$ the vehicle frame, $c$ a bracket having pivoted thereto at the point $d$ a lever arm $f$ having the axle of the wheel $a$ mounted upon one end thereof; $g^1$ $g^2$ $g^3$ $g^4$ are springs whose ends are connected to the lever $f$ either by means of shackles $h^1$, $h^4$ or by rollers $h^2$ $h^3$. The springs $g^2$ $g^3$ bear a tractive stress, the springs $g^1$ $g^4$ bear an extension stress, while the springs $g^5$ $g^6$ serve simply as thurst springs.

When subjected to the shocks of the road, the wheel $a$ (Fig. I) which is mounted at $n$ will rock the lever $f$ on the journal $d$, causing the lever to drive outwardly the roller $h^2$ which will roll in the groove $k$, thus stretching the spring $g^2$ exactly at the same moment that the other end of the lever is caused to draw upon the other spring $g^1$, by means of the shackle $h^1$. Since the bearing points of the spring upon the lever are equidistant from the axis of the latter, the springs of equal effect will thus be secured in position at the same point, and the shock received by the wheel will be transformed at the attaching point $l$ into two equal thrusts which will be equilibrated, since according to mechanical principles they are exerted at the same time upon a rigid body with equal force and in opposite directions. In the preceding example, the spring is disposed above the lever, but it can also be placed below the latter as shown in Fig. 2, and in this case the operation will be the same but in the inverse sense, the spring $g^4$ bearing a tractive stress and the spring $g^3$ an extension stress. In this figure, the roller under extension stress is replaced by a shackle $h^3$.

The arrangement shown in Fig. 3 comprises two double-acting springs placed in opposition, and the method of operation is the same as in the preceding cases. In this arrangement the springs $g^2$ $g^3$ are preferably mounted together with the rollers $h^2$ $h^3$, so as to maintain the rollers at a slight distance from the lever for normal load. The rollers will thereby only contact with the lever and in a gradual manner according to the amount of overload, and by this means an automatic variation in flexibility will be obtained.

Figure 4:
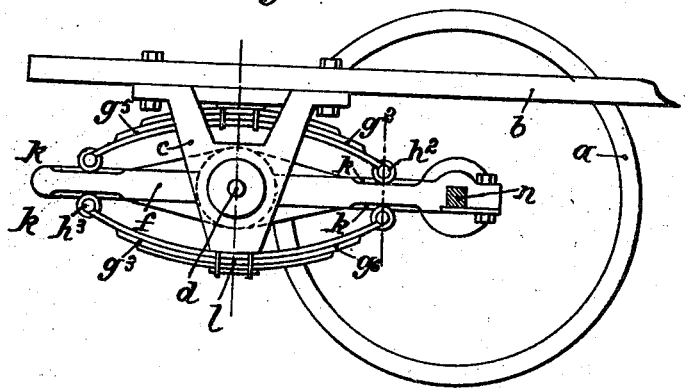
Figs. 4, 5 and 6 show side elevations of three arrangements using two single acting springs, in which one end of each of the said springs serves simply as a thrust spring.

Under the effect of shocks, Fig. 4, the springs $g^2$ $g^3$ will be the only ones acted upon, and will bear an extension stress, while the springs $g^5$ $g^6$ serve simply as thrust springs.

Figure 5:
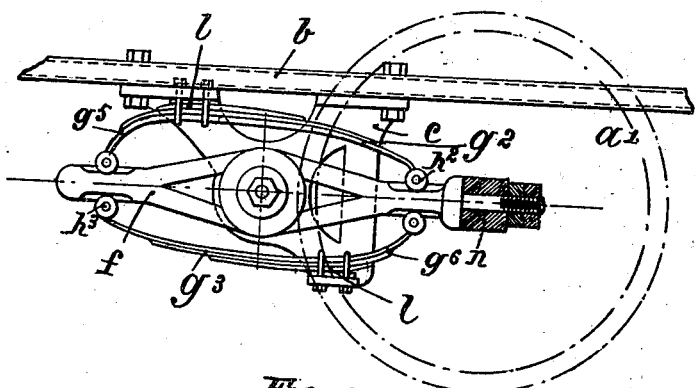
Figure 6:
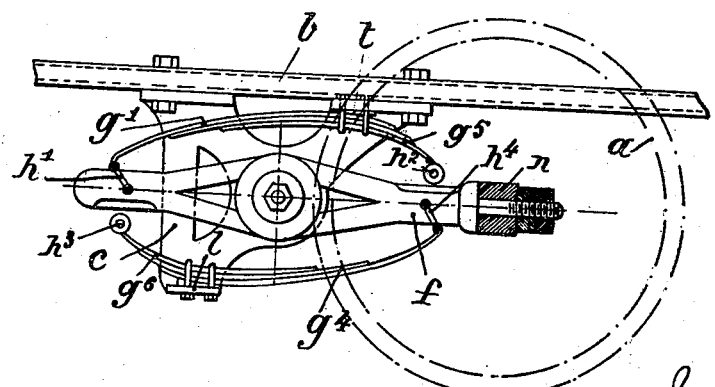

Practically the same result can be obtained by the alternative forms shown in Figs. 5 and 6, with the springs $g^2$ $g^3$ (Fig. 5) bearing an extension stress and the springs $g^1$ $g^4$ (Fig. 6) a tractive stress. The point at which they are secured to the vehicle frame is in this case disposed below the axis of the lever, thus allowing the use of a longer spring than in the preceding cases, which will afford greater flexibility for the same general size. The operation is again the same, the effect of the upper spring being compensated by that of the lower spring. The springs $g^5$ and $g^6$ serve simply as thrust springs. The operation of the alternative form shown in Fig. 7 is also the same; and here the action of the spring $g^2$ subjected to extension stress will compensate that of the spring $g^1$ subjected to tractive stress.

One arrangement for absorbing longitudinal and transverse shocks is represented in Figs. 7, 8 and 9. The lever is here provided with a cylindrical extension $s$, Figs. 7 and 9; having slidable thereon with easy friction a sleeve $n$; a coiled spring $r$ is disposed between one end of this sleeve and the end of the lever $f$, while a second spring $r^1$ is mounted between the other end of the sleeve and a washer $z^2$ disposed against a nut $z$ screwed upon the threaded end $s^1$ of the rod $s$; it being preferable to add to this nut a lock nut $z^1$ or like member. The sleeve $n$ carries a second bearing $n^1$ rotatable upon the first by means of a pivot mounting $p$; the bearing $n^1$ has mounted therein the axle $o$ and its axle box $o^1$ which are thus adapted to rotate in and to slide upon this member with easy friction, the longitudinal movements of the bearing with reference to the axle box and the wheel being submitted to the action of the coiled springs $u$ $u^1$ (Figs. 8 and 9).

In this arrangement, the shocks received by the wheel are transmitted to the members $n$ $n^1$ and absorbed laterally by the springs $u$ $u^1$ and longitudinally by the springs $r$ $r^1$; angular movements of the wheel are allowed in the vertical sense by the journal $s$ and in the horizontal sense by the member $p$. In the present case the axle $o$ is disposed above the axis of the lever $f$, but it may of course be placed below the same should this be made necessary; the plate springs $g^1$ $g^2$, instead of being mounted above the lever $f$, can now be placed below the latter in the case of a vehicle frame of low type, and these two arrangements can be combined as shown in Fig. 10.

The spring mounting shown in Fig. 10 comprises four sets of half-springs $g^1$ $g^2$ $g^3$ $g^4$, this combination affording a great solidity as well as a good distribution of the stresses upon the journal $d$ of the lever. The ends of the lower springs $g^3$ $g^4$ are mounted at $h^3$ $h^4$ $l^3$ $l^4$ in a similar manner to the disposition employed for the upper springs.

The hereinbefore described arrangement for absorbing longitudinal and transverse shocks is not applicable to the case in which the axes of the vehicle axle and the lever arm are located on or about the same level, and an alternative form of this arrangement and applicable to this latter case is shown in Figs. 10 and 11. A casing $j$ provided with the slides $v$ has slidable therein with easy friction a bearing $n^2$ carrying the axle box $o^1$ of the axle $o$, the movement thereof being submitted to the action of the springs $r$ $r^1$ whose tension can be adjusted by means of a device of the kind shown diagrammatically at $k$. On either side of the bearing $n^2$ are disposed the coiled springs $u$ $u^1$ whose function has already been explained. The casing $j$ can be given a swinging movement with reference to the lever arm, by means of a socket $f^2$, the nut $j^1$ being held in fixed position upon the screw threaded end of the rod $s$ by the pin $j^2$ or in any other suitable manner. The bearing $n^2$ can be given a swinging movement with reference to the casing $j$ upon the pivots $m$. It will be readily understood that this disposition affords a means for obtaining the various desired effects.

In the method for mounting the rear axle as shown in Fig. 12, the bearing $n^3$ is connected to the member $n$ by means of the shackles $w^1$. The axle box shown at $w$ is here employed in the same manner as a push and thrust bar, but any like device of a current type can be used. Under the action of shocks, the operation is the same as for the preceding cases, the only difference lying in the use of the shackles $w^1$ to connect the members $n$ and $n^3$.

It is essential to note that the preceding features are in no wise of a limitative nature and that these are susceptible of various additions, suppressions, combinations or modifications without departing from the spirit of the invention. As a particular case, it is allowable to suppress any desired number of the plate half-springs and to retain only one, two or three of these which may be rationally or even arbitrarily chosen among the four springs shown in Fig. 10. In each set of two half-springs, one of these latter can be divided into two portions which are disposed in a similar manner but with one portion on each side of the second spring which is thus held between the two. The rollers used with the springs which are subjected to pressure can be replaced by shackles similar to the ones employed for the springs under traction but these rollers can always be advantageously used in the case of the double arrangement shown in Figs. 3 and 10. In case these rollers are only to come into action when under a given weight, the springs will be given a less curved shape in order to allow the rollers to be spaced away from their bearing surfaces in normal working and to come upon the latter only in case of overloads. Moreover, the different arrangements as described or proposed can be employed either separately or in combination.

The arrangements set forth in this specification are equally applicable to front and to rear wheels, as well as to chain or to cardan shaft drive.

The wheel which is shown at the end of the lever arm can be mounted upon any other suitable point thereof situated nearer the axis.

I claim:—

1. A spring suspension for vehicles, comprising a supporting member mounted below the vehicle frame, a lever pivoted on said member, a vehicle axle mounted on one end of the lever, and plate springs so disposed between the lever and the vehicle frame as to create a return torque.

2. A spring suspension for vehicles, comprising a bracket mounted below the vehicle frame, a lever pivoted on said bracket, a vehicle axle mounted on one end of the lever, a plurality of springs disposed between the lever and the vehicle frame, and shackles connecting the ends of the springs to said lever.

3. A spring suspension for vehicles, comprising a bracket mounted below the vehicle frame, a lever pivoted on said bracket, a vehicle axle mounted on one end of the lever, a plurality of springs disposed between the lever and the vehicle frame, and rollers carried by the ends of the springs and resting on the lever.

4. A spring suspension for vehicles, comprising a bracket mounted below the vehicle frame, a lever pivoted on said bracket, a vehicle axle mounted on one end of the lever, a plurality of springs disposed between the lever and the vehicle frame, a roller interposed between the end of one of the springs and said lever, and a shackle connecting the latter to one of the springs.

5. A spring suspension for vehicles, comprising a bracket mounted below the vehicle frame, a lever pivoted on said bracket, a vehicle axle mounted on one end of the lever, and plate springs disposed above and below the lever arm.

6. A spring suspension for vehicles comprising a support mounted below the vehicle frame, a lever arm pivoted on said support, a vehicle axle mounted on one end of the lever, and a plurality of groups of plate springs, disposed between the lever and frame, the attaching points of said springs being displaced in the opposite sense with reference to a vertical line passing through the point of articulation of the lever arm.

7. A spring suspension for vehicles, comprising a bracket, mounted below the vehicle frame, a lever arm pivoted on said bracket, a vehicle axle mounted on one end of the lever arm, two plate half springs disposed above the lever arm, and two plate half-springs disposed below said lever arm, said springs being attached at points displaced an equal distance on either side of a vertical line passing through the point of articulation of the lever arm.

8. A spring suspension for vehicles comprising a bracket mounted below the vehicle frame, a lever arm pivoted on said bracket, a vehicle axle mounted on one end of the lever arm, a pair of plate half-springs disposed above the lever arm, a pair of plate half springs disposed below the lever arm, one half spring of each pair being divided into two elements and disposed on each side of the second half-spring of the pair.

9. A spring suspension for vehicles, comprising a bracket, mounted below the vehicle frame, a lever arm pivoted on said bracket, a vehicle axle mounted on one end of the lever arm, two plate half-springs disposed above the lever arm, and two plate half-springs disposed below said lever arm, said springs being attached at points displaced an equal distance on either side of a vertical line passing through the point of articulation of the lever arm, and resilient means for absorbing longitudinal shocks.

10. A spring suspension for vehicles, comprising a bracket, mounted below the vehicle frame, a lever arm pivoted on said bracket, a vehicle axle mounted on one end of the lever arm, two plate half-springs disposed above the lever arm, and two plate half-springs disposed below said lever arm, said springs being attached at points displaced an equal distance on either side of a vertical line passing through the point of articulation of the lever arm, and resilient means for absorbing transverse shocks.

11. A spring suspension for vehicles, comprising a bracket, mounted below the vehicle frame, a lever arm pivoted on said bracket, a vehicle axle mounted on one end of the lever arm, two plate half-springs disposed above the lever arm, and two plate half-springs disposed below said lever arm, said springs being attached at points displaced an equal distance on either side of a vertical line passing through the point of articulation of the lever arm, and resilient means for absorbing longitudinal shocks, and resilient means for absorbing transverse shocks.

12. A spring suspension for vehicles, comprising a bracket, mounted below the vehicle frame, a lever arm pivoted on said bracket, a vehicle axle mounted on one end of the lever arm, two plate half-springs disposed above the lever arm, and two plate half-spring disposed below said lever arm, said springs being attached at points displaced an equal distance on either side of a vertical line passing through the point of articulation of the lever arm, resilient means for absorbing longitudinal shocks, resilient means for absorbing transverse shocks, and articulated means whereby the wheels may have vertical and horizontal movements.

In witness whereof I have hereunto signed my name in the presence of a subscribing witness.

EDMOND JEAN LEON GAUTHIER.

Witness:
CLEMENT S. EDWARDS.